May 3, 1960  E. A. STALKER  2,935,297
VIBRATION DAMPERS FOR ROTOR BLADES
Filed June 9, 1954  2 Sheets-Sheet 1

INVENTOR.
Edward A. Stalker

May 3, 1960  E. A. STALKER  2,935,297
VIBRATION DAMPERS FOR ROTOR BLADES
Filed June 9, 1954  2 Sheets-Sheet 2
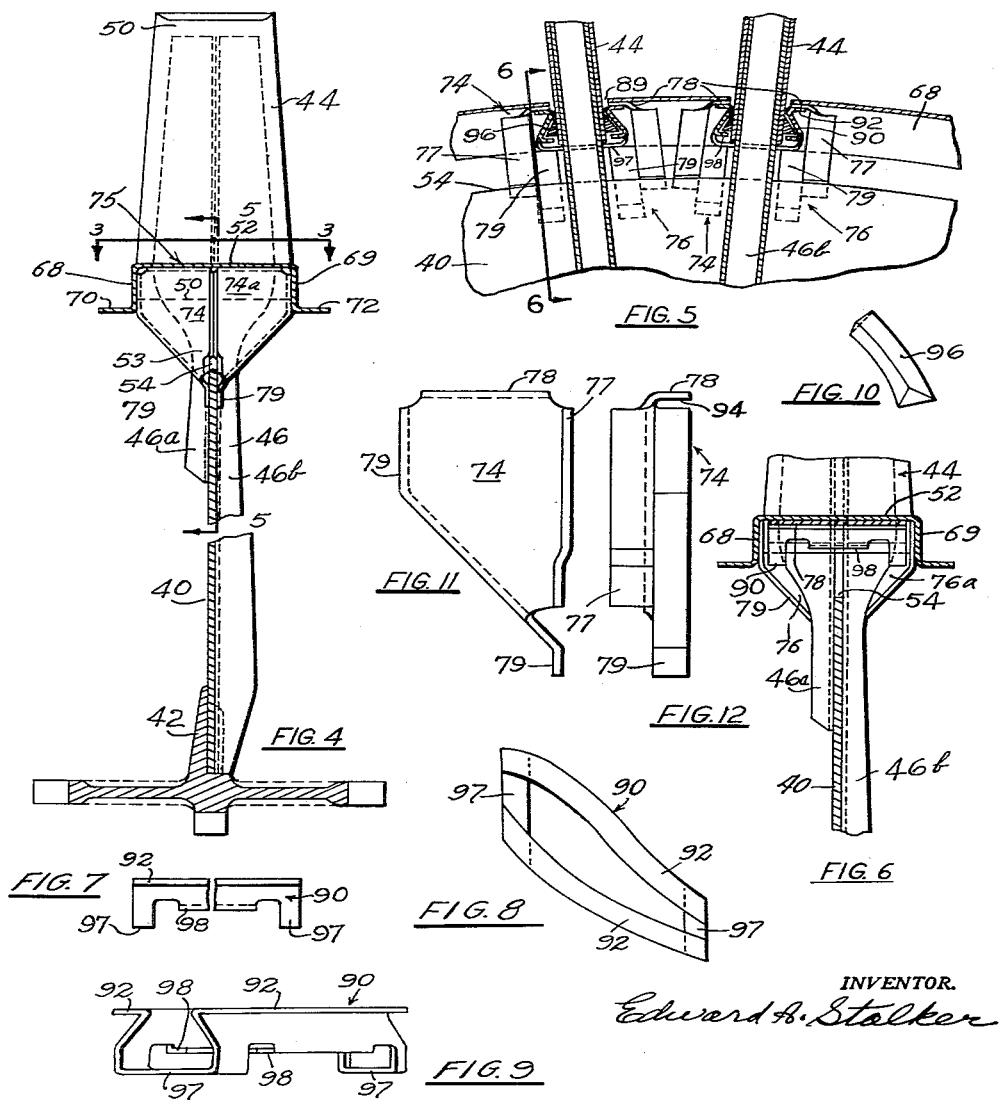
INVENTOR.
Edward A. Stalker

United States Patent Office 2,935,297
Patented May 3, 1960

2,935,297
VIBRATION DAMPERS FOR ROTOR BLADES

Edward A. Stalker, Bay City, Mich., assignor to The Stalker Corporation, a corporation of Michigan Application June 9, 1954, Serial No. 435,464

8 Claims. (Cl. 253—77)

This invention relates to fluid machines such as compressors, turbines and the like.

An object of the invention is to provide a damping means for the blades of fluid machines and particularly machines of sheet metal construction.

Another object is to provide blade means incorporating vibration damping means which utilize the action of centrifugal force.

Other objects will appear from the specification, drawings and claims.

The above objects are accomplished by the means illustrated in the accompanying drawings in which—

Fig. 4 is an enlarged fragmentary axial section of the rotor;

Fig. 5 is an enlarged transverse section on line 5—5 in Fig. 4;

Fig. 6 is a fragmentary section of the rotor on line 6—6 in Fig. 5;

Fig. 7 is a side view of a damper isolated from the rotor;

Fig. 8 is a top plan view of the damper of Fig. 7;

Fig. 9 is a perspective view of the damper;

Fig. 10 is a fragmentary perspective of a damper edge;

Fig. 11 is a peripheral or side view of a bracket for supporting a rim segment, there being four of such brackets which constitute a set for each blade;

Fig. 12 is an end view of the bracket of Fig. 11;

Figure 1:
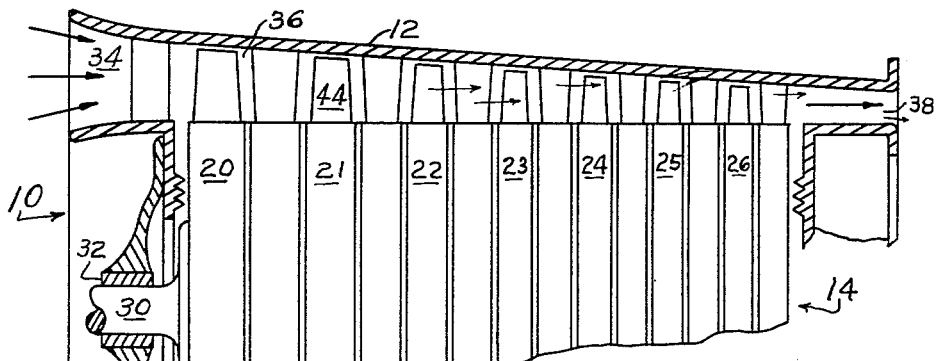
Fig. 1 is a fragmentary axial section through a compressor showing a rotor according to this invention.

Compressor and turbine blades and the like are subject to vibration inducing forces and are frequently destroyed by them. Thus the forces and frequency of vibration have significant magnitude. In the present invention the vibration energy is dissipated chiefly by frictional forces preferably augmented by centrifugal action.

The blades of each of the wheels making up a rotor are supported so that when they vibrate the principal node or pivot line about which the principal vibration takes place is spaced inward from the rim or perimeter of the wheel hub structure. The rim has a recess for each blade. A damper means is secured in the wheel to rub on a surface of the hub structure or a blade to develop frictional forces for damping vibrations.

Referring now to the drawings and particularly to Figs. 1–4 the compressor is indicated generally as 10. It comprises the case 12 and the rotor 14 made up of the bladed wheels 20—26. The rotor is supported on the shaft 30 in the bearing 32. Fluid enters the inlet 34, flows through the annular passage 36 to the exit 38.

All the bladed wheels are similar to wheel 21 which will now be described in detail. See Figs. 1 and 4 particularly. It is comprised of the wheel disk 40 fixed to the hub ring 42. The blade means are peripherally spaced about the wheel and each includes a blade 44 fixed to the disk by blade stem means 46. Each stem is comprised of the parts 46a and 46b fixed to the internal surfaces of the blade envelope 50. These are preferably soldered to the disk 40. In each blade the envelope 50 preferably extends inward a short distance from the surface of a rim segment 52. These rim segments have the front and rear side flanges 68 and 69, and end flanges 70 and 72.

The blade will tend to vibrate about the inner or root portion 53 thereof adjacent the perimeter 54 of the wheel disk 40.

Figure 3:
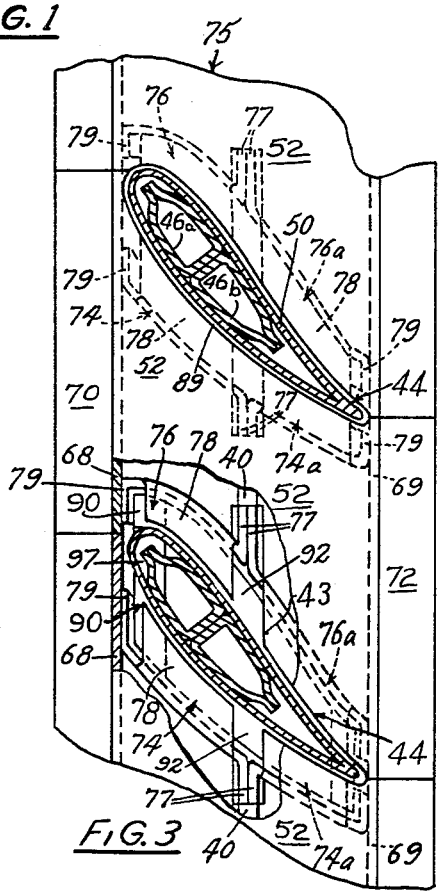
Fig. 3 is a radial view of a fragment of the rotor on line 3—3 of Fig. 4 with a portion of the rim broken away.

The rim segments 52 are secured to and supported by the pairs of brackets 74, 74a and 76, 76a on the disk 40 and comprise a rim means 75. Each of the brackets has an end flange 77 which match with each other as shown in Fig. 3 to join the respective pairs of brackets together into an effectively unitary structure. See Figs. 4 to 12.

Each bracket has a flange 78 lapping adjacent rim segments 52 and fixed thereto to form an integral peripheral rim means 75. The side flanges 79 at their outer portions are also fixed to the front and rear walls 68, 69 of the segment while the inner portions are fixed to the sides of and carried by the disk 40. Thus the hub ring 42, the disk 40, the brackets 74, 74a, 76, 76a and the rim segments are all secured together and collectively form a hub structure.

Each blade passes through a rim opening or recess 89 with some clearance on the sides to accommodate movement of the blade in the peripheral direction. To damp vibration a damper element 90 is fitted about the blade for movement therewith. It has the flanges 92 extending laterally for bearing against the surfaces of the bracket flanges 78 under the centrifugal force arising from rotation. The bracket flanges 78 form part of the hub structure and are relatively fixed with respect to the rim and wheel disk 40.

To insure that the damper is moved immediately with the movement of the blade, a damper part or wedge 96 is provided between the damper and the blade. This wedge moves outward under centrifugal force and wedges itself between the damper and the sides of the blade effectively making the damper fixed or secured to the blade during rotation of the wheel.

The greater the rate of rotation the harder the damper is pressed against the surface of flange 78 giving a greater damping friction. This action is important since the exciting forces causing vibration of the blades increase with the rate of rotation.

Each damper 90 has the straps 97 tying together the flanges 92 on opposite sides of the blade. These straps pass under the end of the blade envelope at the front and rear sides of the stem means. See Figs. 5 and 9.

Each damper also has the clips 98 for keeping the wedges in their general position.

Figure 14:
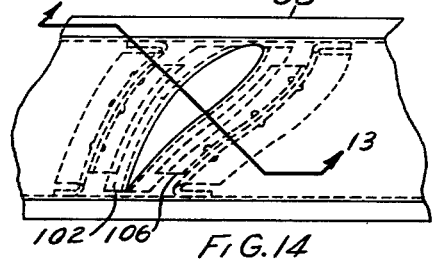
Fig. 14 is a fragmentary radial view of the rim of the rotor of Fig. 13.
Figure 2:
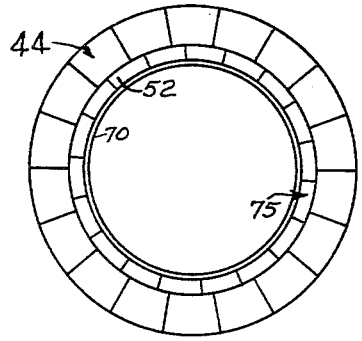
Fig. 2 is an axial or end view of the rim and blades of a rotor of Fig. 1.
Figure 13:
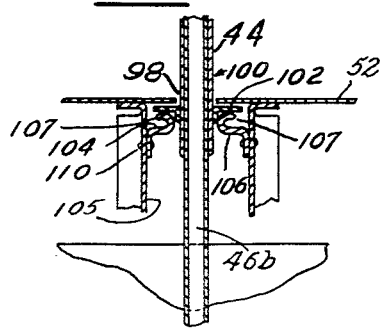
Fig. 13 is a fragmentary transverse section of a rotor at its rim, on line 13—13 in Fig. 14, showing an alternate form of damper.

In another form of the invention as shown in Figs. 13 and 14 the blade means 100 may include, as shown, the blade 44 and the damper parts 102 are secured to the blade. Complementary damper elements 104 and 106 are fixed to the walls 105 which are substantially the same as brackets 74, 74a and 76, 76a. Each damper element has a free end 107 bearing on a damper part 102 carried by the blade in rubbing frictional contact therewith if the parts and elements vibrate one relative to another. The elements may be fixed to the walls 105 by rivets 110 or by solder. When the wheel is rotated about its axis the free ends of the damper elements are pressed by centrifugal action against the damper part thereby augmenting the damping friction.

While I have illustrated specific forms of the invention, it is to be understood that variations may be made therein and that I intend to claim my invention broadly as indicated by the appended claims.

What I claim is:

1. In an axial flow fluid wheel, a hub structure having means for mounting the same for rotation about an axis to exchange force with a fluid, said hub structure having a rim and a recess in the perimeter of said rim, a blade positioned in said recess and secured to said hub structure at a locality inward from said recess, said blade tending to vibrate during rotation of said wheel, said blade extending radially outward from said rim, and damper means separate from and displaceably mounted on said blade and bearing against a portion of said hub structure for pressing thereagainst under the action of centrifugal force arising from rotation of said wheel about said axis, to damp vibration of said blade.

2. In an axial flow fluid wheel, a hub structure having means for mounting the same for rotation about an axis to exchange force with a fluid, said hub structure having a recess in the perimeter thereof, a blade positioned in said recess and secured to said hub structure at a locality inward from said perimeter, said blade tending to vibrate during rotation of said wheel, said blade extending radially outward from said perimeter, a radially displaceable damper part engaging and movable with the vibrational movement of said blade in the peripheral direction, and a damper element receiving said damper part and bearing on said hub structure in rubbing frictional contact therewith under the action of centrifugal force of said damper part arising from rotation of said wheel about said axis, to damp vibration of said blade.

3. In an axial flow fluid wheel, a hub structure having means for mounting the same for rotation about an axis to exchange force with a fluid, said hub structure having a rim and a recess in the perimeter thereof, a blade positioned in said recess and secured to said hub structure at a locality inward from said perimeter, said blade tending to vibrate during rotation of said wheel, said blade extending radially outward from said rim perimeter, and a radially displaceable damping means in contact with said blade adjacent said locality and bearing against said hub structure in rubbing frictional contact therewith under the action of centrifugal force on said damping means arising from rotation of said wheel about said axis, to damp vibration of said blade.

4. In combination in an axial flow bladed wheel for exchanging energy with a fluid, a hub means defining an axis of wheel rotation and including a wheel disk, a hollow rim means of sheet metal carried by said disk and having a plurality of peripherally spaced openings therein, a plurality of axial flow blades peripherally spaced about said rim means and each having a part thereof extending radially inward through a said opening in spaced relation to the side thereof, each said part being secured to said hub means at a locality inward from said rim defining a center of vibration for said blade, and cooperating damper means operably in contact with said blade part between the outer perimeter of said rim means and said locality for vibrational movement therewith in the peripheral direction and in frictional engagement with said hub means, a part of said damper means being displaceable radially outwardly under the action of centrifugal force to develop rubbing frictional contact between said damper means and said hub means under the action of centrifugal force to damp the vibrations of said blade.

5. In combination in an axial flow bladed wheel for exchanging energy with a fluid, a hub means defining an axis of wheel rotation and including a wheel disk, a hollow rim means of sheet metal carried by said disk and having a plurality of peripherally spaced openings therein, a plurality of axial flow blade means each comprising a blade having a part thereof extending radially inward through a said opening in spaced relation to the sides thereof, each said part being secured to said hub means at a locality inward from said rim defining a center of vibration for said blade, and damper means having direct contact with said blade and mounted for vibrating movement along with said blade in the peripheral direction, said damper means having frictional bearing engagement with a portion of said hub means under the action of centrifugal force to damp the vibrations of said blade.

6. In combination in a fluid wheel, a hub structure having means for mounting the same for rotation about an axis of rotation, a blade means positioned on said hub structure, said blade means including a blade extending radially outward from said hub structure and radially inward to a locality of attachment to said hub structure spaced inward from the outer perimeter thereof, said blade tending to vibrate with respect to said locality during rotation of said wheel, and damping means displaceable radially outwardly and in direct contact with said blade for vibrating movement in the peripheral direction therewith, said damping means bearing on a wall of said hub structure for pressing thereagainst in rubbing frictional contact therewith under the action of centrifugal force during rotation of said wheel about said axis, to damp vibration of said blade.

7. In a bladed fluid wheel for exchanging force with a fluid, a hub structure having means for the mounting thereof for rotation about an axis of rotation, said hub structure having a recess in the perimeter thereof, a blade positioned in said recess and secured to said hub structure at a locality inward from said perimeter, said blade being spaced from the sides of said recess and tending to have vibrations relative thereto when said wheel is rotated about said axis, a damping part secured on each said blade within said recess for vibrating movement with said blade in the peripheral direction, and means within said recess for mounting said damper part for displaceable movement radially outwardly under centrifugal action, said hub structure having a surface engageable with said damper part in sliding frictional contact therewith to damp the vibrations of said blade.

8. In a bladed wheel for exchanging force with a fluid, a hub structure having means for mounting the same for rotation about an axis, said hub structure having a recess in the rim thereof, a blade in said recess spaced from the sides thereof and secured to said hub structure at a locality inward from said rim, said blade tending to have vibrations when said wheel is rotated about said axis, a damper element within said recess movable in rubbing frictional contact with said hub structure to damp the vibration of said blade, and a damper wedge within said damper element radially displaceable outwardly under the action of centrifugal force and having direct contact with said blade to move with the vibrational movement of said blade in the peripheral direction and to transmit blade vibrations to said damper element.

References Cited in the file of this patent

UNITED STATES PATENTS

| | | |
|---|---|---|
| 2,310,412 | Flanders | Feb. 9, 1943 |
| 2,436,087 | Benson | Feb. 17, 1948 |
| 2,595,829 | Dean | May 6, 1952 |
| 2,727,716 | Feilden | Dec. 20, 1955 |
| 2,783,023 | Stalker | Feb. 26, 1957 |

FOREIGN PATENTS

| | | |
|---|---|---|
| 989,556 | France | May 23, 1951 |